US012800778B2

(12) United States Patent
Ohashi et al.

(10) Patent No.: US 12,800,778 B2
(45) Date of Patent: Nov. 17, 2026

(54) RADIATION IMAGING APPARATUS

(71) Applicant: CANON KABUSHIKI KAISHA, Tokyo (JP)

(72) Inventors: Koichiro Ohashi, Kanagawa (JP); Riku Egawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 186 days.

(21) Appl. No.: 18/675,545

(22) Filed: May 28, 2024

(65) Prior Publication Data

US 2024/0402365 A1 Dec. 5, 2024

(30) Foreign Application Priority Data

May 31, 2023 (JP) ................................ 2023-090273
Jun. 12, 2023 (JP) ................................ 2023-096030
Feb. 19, 2024 (JP) ................................ 2024-023262

(51) Int. Cl.
*G01T 1/24* (2006.01)
*G01T 1/175* (2006.01)

(52) U.S. Cl.
CPC .............. *G01T 1/244* (2013.01); *G01T 1/175* (2013.01)

(58) Field of Classification Search
None
See application file for complete search history.

(56) References Cited

U.S. PATENT DOCUMENTS 10,379,437 B2 * 8/2019 Kim .................... G01T 1/20188
2013/0240732 A1 * 9/2013 Urbon .................... G03B 42/04 250/336.1
2020/0100739 A1 * 4/2020 Horiuchi .................. G01T 1/20

FOREIGN PATENT DOCUMENTS

| | | | | |
|---|---|---|---|---|
| JP | 2011203724 | A | | 10/2011 |
| JP | 2011232667 | A | * | 11/2011 |
| JP | 2012063341 | A | * | 3/2012 |
| JP | 2012177870 | A | | 9/2012 |
| JP | 2012181238 | A | | 9/2012 |
| JP | 2013013513 | A | | 1/2013 |
| JP | 2013130539 | A | | 7/2013 |
| JP | 2019164040 | A | | 9/2019 |
| JP | 2020049161 | A | | 4/2020 |

* cited by examiner

*Primary Examiner* — Marcus H Taningco
(74) *Attorney, Agent, or Firm* — Canon U.S.A., Inc. IP Division

(57) ABSTRACT

A radiation imaging apparatus includes a radiation detection panel configured to detect radiation, a holding member configured to hold a power supply, and a casing configured to house the radiation detection panel, the power supply, and the holding member, wherein the casing includes a top surface portion allowing the radiation to enter the radiation detection panel, a bottom surface portion located on a side opposite to the top surface portion, and a side surface portion connecting the top surface portion and the bottom surface portion, wherein the side surface portion includes an opening through which the power supply is inserted into and removed from the casing, and wherein the holding member is a separate part from the casing and fixed to the casing.

19 Claims, 17 Drawing Sheets

RADIATION IMAGING APPARATUS

BACKGROUND

Field

The present disclosure generally relates to a radiation imaging apparatus. The radiation imaging apparatus is an apparatus used as a medical diagnosis apparatus and a non-destructive inspection apparatus, and is, for example, an X-ray flat panel detector.

Description of the Related Art

At the sites of industrial non-destructive inspection and medical diagnosis, a radiation imaging apparatus (radiation detection apparatus) that detects radiation that has transmitted through an object to obtain a radiation image is used. Further, nowadays, in consideration of portability of the radiation imaging apparatus, a radiation imaging apparatus operable by power supplied from a battery as a power supply has been widely used.

Japanese Patent Application Laid-Open No. 2012-181238 discusses a radiation imaging apparatus in which a battery is replaceable by being inserted into/removed from a side.

The radiation imaging apparatus discussed in Japanese Patent Application Laid-Open No. 2012-181238 has room for improvement in terms of cleaning easiness. This is because the radiation imaging apparatus discussed in Japanese Patent Application Laid-Open No. 2012-181238 includes a thin groove is generated at a battery mounting portion on the bottom surface of the radiation imaging apparatus, and in a case where liquid or power contaminant is present at an installation position of the radiation imaging apparatus, the contaminant may enter the groove and is difficult to be removed.

SUMMARY

The present disclosure is made in consideration of such issues, and is directed to a radiation imaging apparatus in which a power supply is detachable and a bottom surface is easily cleaned.

According to some embodiments, a radiation imaging apparatus includes a radiation detection panel configured to detect radiation, a holding member configured to hold a power supply, and a casing configured to house the radiation detection panel, the power supply, and the holding member, wherein the casing includes a top surface portion allowing the radiation to enter the radiation detection panel, a bottom surface portion located on a side opposite to the top surface portion, and a side surface portion connecting the top surface portion and the bottom surface portion, wherein the side surface portion includes an opening through which the power supply is inserted into and removed from the casing, and wherein the holding member is a separate part from the casing and fixed to the casing.

Further features of the present disclosure will become apparent from the following description of exemplary embodiments with reference to the attached drawings.

DESCRIPTION OF THE EMBODIMENTS

In the following, specific exemplary embodiments of the present disclosure are described in detail with reference to drawings. The exemplary embodiments described below do not limit the disclosure according to the claims. In the exemplary embodiments, a plurality of components of an apparatus is described; however, all of the components are not necessarily essential for the disclosure. For example, some of the components may be eliminated or replaced. Further, features of the plurality of exemplary embodiments may be combined.

System

Figure 10:
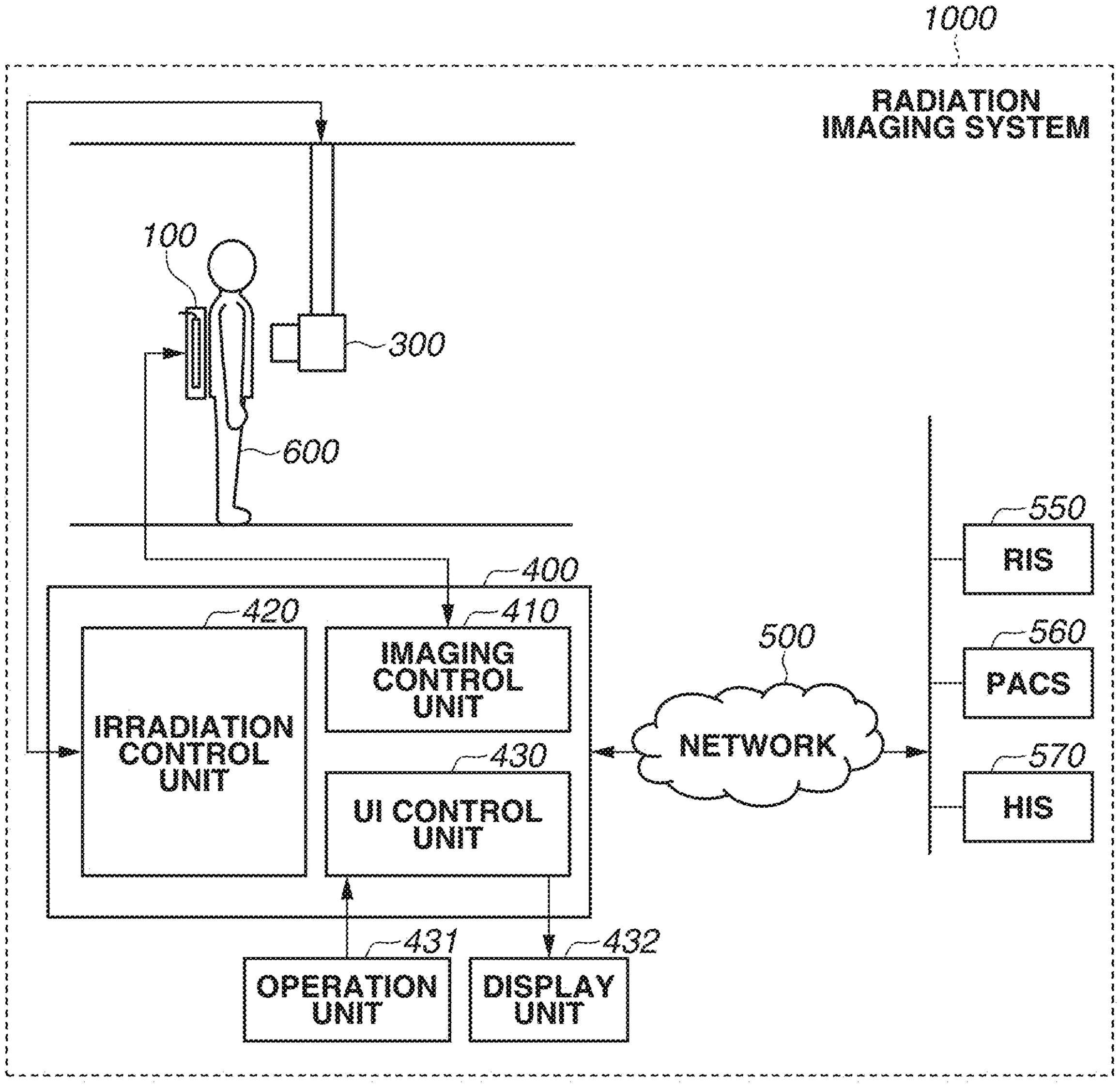
FIG. 10 is a diagram illustrating a configuration of a radiation imaging system.

A first exemplary embodiment will be described. A radiation imaging system that is a use environment of a radiation imaging apparatus (radiation photographing apparatus or radiation detection apparatus) is described. FIG. 10 is a diagram illustrating a schematic configuration of the radiation imaging system. A radiation imaging system 1000 includes a radiation imaging apparatus 100, a control apparatus 400, a radiation generation unit 300, a radiology information system (RIS) 550, a picture archiving and communication system (PACS) 560, and a hospital information system (HIS) 570.

The radiation generation unit (radiation generation apparatus or radiation irradiation apparatus) 300 includes a radiation tube for generating radiation, and irradiates an object 600, such as a patient, with radiation. The radiation according to the present exemplary embodiment can include an X-ray as well as other rays including, for example, an α-ray, a β-ray, a γ-ray, a particle ray, a cosmic ray, or the like.

The radiation imaging apparatus 100 generates an image based on the radiation irradiated from the radiation generation unit 300. The radiation imaging apparatus 100 is, for example, a flat panel detector. Details of the radiation imaging apparatus 100 will be described below.

The control apparatus 400 is an apparatus relaying the radiation imaging apparatus 100, the radiation generation unit 300, and those apparatuses connectable through a network 500. The control apparatus 400 includes an imaging control unit 410, an irradiation control unit 420, and a user interface (UI) control unit 430.

The imaging control unit 410 can include one or more processors, circuitry, or combinations thereof, and performs various kinds of control for radiation imaging (radiation photographing) by communicating with the radiation imaging apparatus 100. For example, the imaging control unit 410 performs various kinds of communication processing involved in radiation imaging, on the radiation imaging apparatus 100. In the communication processing, setting information on imaging conditions, setting information on operation control, image information, reached dose information, and the like are exchanged.

The irradiation control unit 420 can include one or more processors, circuitry, or combinations thereof, and controls an irradiation condition of the radiation and the like by communicating with the radiation generation unit 300.

The irradiation control unit 420 outputs information, such as an irradiation control signal, to the radiation generation unit 300 based on the acquired dose information.

The irradiation control signal transmitted from the irradiation control unit 420 to the radiation generation unit 300 may include a stop signal (irradiation stop signal) for stopping irradiation of the radiation and an irradiation signal (irradiation non-stop signal) for irradiating the radiation. The irradiation control unit 420 can control irradiation and stoppage of the radiation from the radiation generation unit 300 by controlling output of one or both of the stop signal and the irradiation signal.

The UI control unit 430 can include one or more processors, circuitry, or combinations thereof, and controls input of information via an operation unit 431 and output of information via a display unit 432. For example, the imaging condition of the radiation imaging is input via the operation unit 431, and a result of the radiation imaging is output via the display unit 432. The operation unit 431 includes an input device such as a keyboard, a pointing device (e.g., mouse), and a touch panel. The display unit 432 includes a monitor such as a liquid crystal display or another display.

Various kinds of information necessary for the radiation imaging are input to the UI control unit 430 by an engineer. Examples of the input information can include a dose, an irradiation time (milliseconds (ms)), a tube current (milliamps (mA)), a tube voltage (kilovolt (kV)), a lighting field that is a region where radiation is detected, or other types of information. The information is transmitted to the radiation imaging apparatus 100 via the imaging control unit 410.

The imaging control unit 410, the irradiation control unit 420, and the UI control unit 430 can cooperate with one another by performing communication. In FIG. 10, a single control apparatus 400 is illustrated for simplification of the description; however, there may be a plurality of control apparatuses 400. For example, the imaging control unit 410, the irradiation control unit 420, and the UI control unit 430 may be independent of one another.

The control apparatus 400 is connected to the radiation generation unit 300 by wired communication, and is connected to the radiation imaging apparatus 100 by wired communication or wireless communication. The control apparatus 400 controls operations of the apparatuses by communicating with the apparatuses. The wired communication can be performed via a local area network (LAN) such as Ethernet®; however, the communication may be performed by another wired communication scheme. A wireless communication unit (not illustrated) that is a configuration for wireless communication includes, for example, an antenna for transmitting/receiving radio waves and a communication integrated circuit (IC). A circuit board including the communication IC performs communication processing via the antenna according to protocols that are based on a wireless LAN. In this case, a frequency band, a standard, and a scheme in the wireless communication are not particularly limited, and short-range wireless communication such as near field communication (NFC) and Bluetooth®, or a scheme such as ultra-wide band (UWB) may be used. The wireless communication unit may have a plurality of wireless communication schemes and may be configured to perform wireless communication by appropriately selecting any of the wireless communication schemes.

The control apparatus 400 is connected to the RIS 550, the PACS 560, and the HIS 570 via the network 500, and can exchange the radiation image, patent information, and the like with these connected systems. In FIG. 10, the radiation imaging system 1000 includes the RIS 550, the PACS 560, and the HIS 570; however, the system may not include at least a part thereof.

Radiation Imaging Apparatus

Figure 1A:
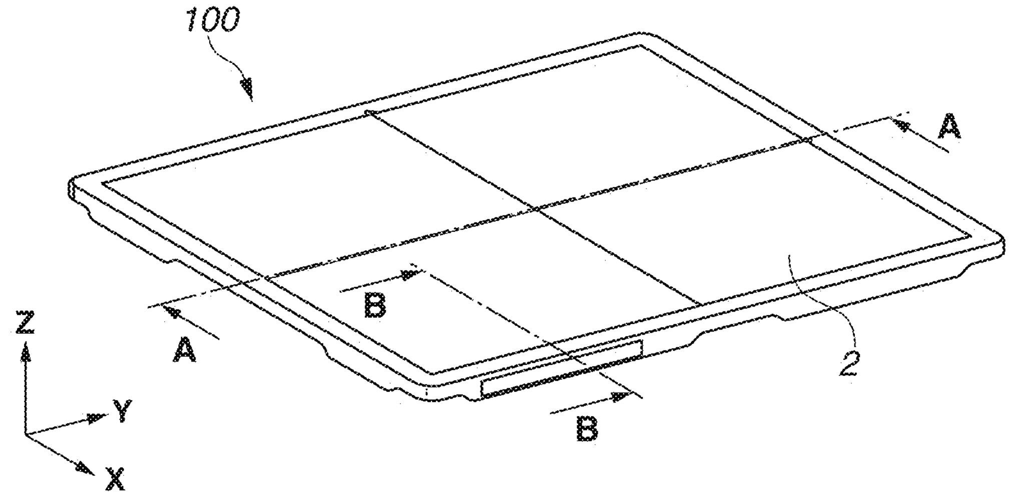
FIG. 1A is a perspective view illustrating a top surface side of a radiation imaging apparatus.
Figure 1B:
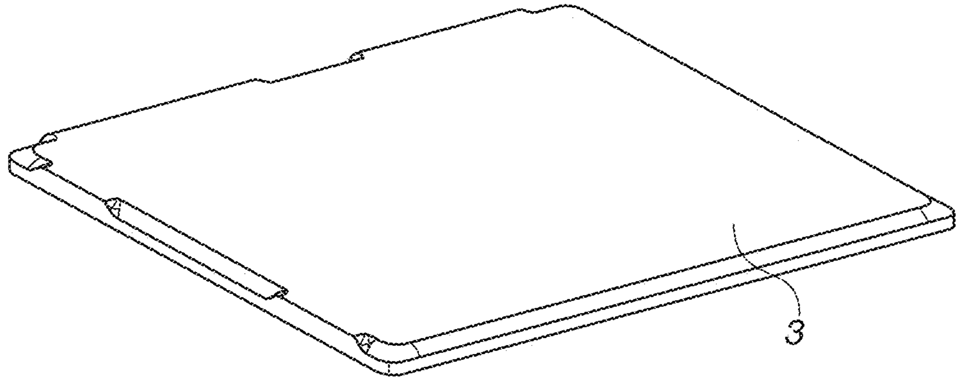
FIG. 1B is a perspective view illustrating a bottom surface side of the radiation imaging apparatus.
Figure 2:
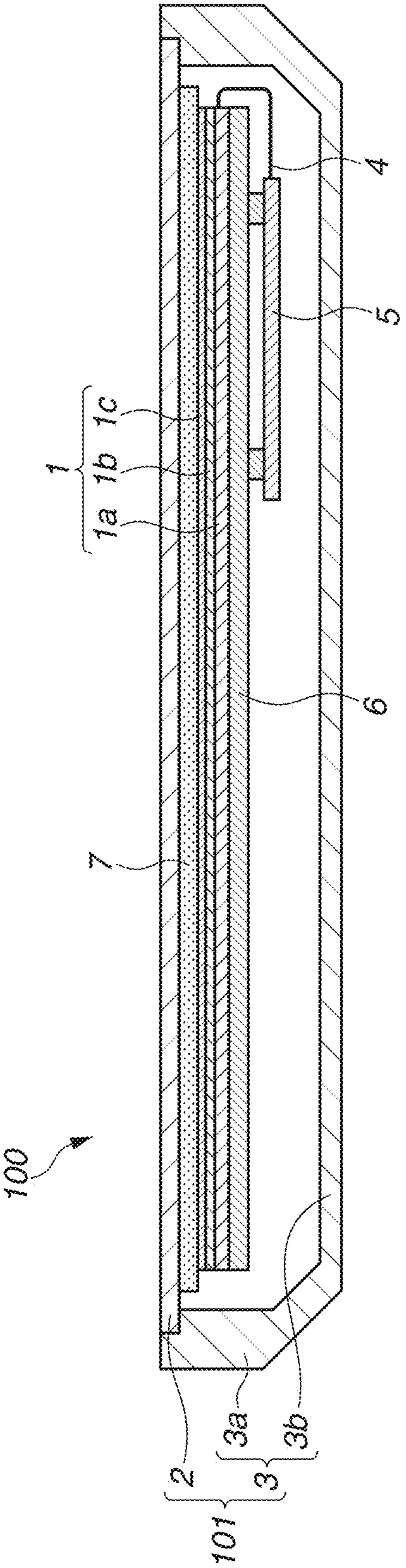
FIG. 2 is a cross-sectional view of the radiation imaging apparatus taken along line A-A of FIG. 1A.

The radiation imaging apparatus 100 according to a first exemplary embodiment will be described. FIG. 1A is a perspective view illustrating a top surface side of the radiation imaging apparatus 100. FIG. 1B is a perspective view illustrating a bottom surface side of the radiation imaging apparatus 100. FIG. 2 is a cross-sectional view of the radiation imaging apparatus 100 taken along line A-A illustrated in FIG. 1A.

The radiation imaging apparatus 100 includes a radiation detection panel 1 for converting radiation into electric signals. The radiation detection panel 1 has a function of converting incident radiation into electric signals. The radiation detection panel 1 includes a sensor substrate 1*a* in which a plurality of photoelectric conversion elements is two-dimensionally arranged on a glass substrate or a resin film base material, a phosphor layer 1*b* disposed on the sensor substrate 1*a*, and a phosphor protection film 1*c* disposed on the phosphor layer 1*b*. As the plurality of photoelectric conversion elements arranged on the sensor substrate 1*a*, MIS-type or PIN-type conversion elements that can detect visible light are used. The phosphor protection film 1*c* is made of a material relatively high in moisture-proof properties, and is used to protect the phosphor layer 1*b*. The radiation detection panel 1 includes an effective imaging region where an incident radiation can be imaged as a radiation image. In the radiation detection panel 1, a whole or a part of a region on the plain surface on which the plurality of photoelectric conversion elements is arranged is defined as the effective imaging region as viewed from an incident direction of the radiation.

With the above-described configuration, in the radiation detection panel 1, the phosphor layer 1*b* emits light in response to the incident radiation, and the photoelectric conversion elements arranged on the sensor substrate 1*a* convert the emitted light into electric signals. In the radiation detection panel 1, in place of the phosphor layer 1*b* and the photoelectric conversion elements, conversion elements of a direct conversion type that directly convert radiation into electric signals may be used.

The radiation detection panel 1 is electrically connected to a control substrate 5 via a flexible circuit board 4. The control substrate 5 reads the electric signals converted by the radiation detection panel 1, and processes the read electric signals. The control substrate 5 converts the electric signals into digital signals to acquire radiation image data.

The above-described components are supported by a support base 6. The support base 6 supports the radiation detection panel 1 on a radiation incident surface side. The support base 6 also supports the control substrate 5 on a surface opposed to the surface supporting the radiation detection panel 1. A buffer material 7 for protecting the radiation detection panel 1 from external force may be provided between a casing 101 and the radiation detection panel 1. The radiation imaging apparatus 100 further includes a battery 8 that supplies power to be used for operations of the radiation detection panel 1 and the control substrate 5. The battery 8 is an example of a built-in power supply that can be attached to and detached from the radiation imaging apparatus 100. As the built-in power supply, a lithium-ion battery, a lithium-ion polymer battery, an all-solid-state battery, an electric double-layer capacitor, or a capacitor can be used. In the present exemplary embodiment, only one battery is provided; however, the number of batteries is not limited thereto, and a plurality of batteries may be provided.

The casing 101 encloses the above-described components. The casing 101 includes an incident surface 2 (top surface portion) to which the radiation enters, and a rear surface casing 3. The rear surface casing 3 includes a rear surface portion 3*b* (bottom surface portion) that comes into contact with an installation surface at a position (on a side) opposed to the incident surface 2 with the radiation detection panel 1 interposed therebetween, and four side surface portions 3*a* (side wall portions). In the rear surface casing 3, the rear surface portion 3*b* (bottom surface portion) and the four side surface portions 3*a* are integrated as a single structural element.

The incident surface 2 desirably have a relatively high radiation transmittance in order to allow the radiation to enter the radiation detection panel 1. Further, the incident surface 2 is desirably light in weight, and secures constant strength against impact. Therefore, for example, a resin material or a carbon fiber reinforced plastic (CFRP) is used for the incident surface 2.

It is desirable for the rear surface casing 3 to have strength against fall, impact, and the like, a light weight for reducing a burden during transportation, and excellent operability for a user. For example, a metal alloy containing magnesium or aluminum or both, CFRP, or a fiber reinforced resin is used as a material of the rear surface casing 3.

In the present exemplary embodiment, the casing 101 has a two-piece structure in which the incident surface 2 and the rear surface casing 3 are joined by fastening with screws or bonded together with an adhesive. In the present exemplary embodiment, the rear surface portion 3*b* and the side surface portions 3*a* are integrally configured into a single configuration, i.e., the rear surface casing 3, and the casing 101 adopts the two-piece structure in which the rear surface casing 3 is separated from the incident surface 2. However, the incident surface 2 and the side surface portions 3*a* may be integrally configured into a front surface casing (not illustrated), and the casing 101 may adopt a two-piece structure in which the front surface casing (not illustrated) is separated from the rear surface portion 3*b*. In the casing 101 having the two-piece structure as in the present exemplary embodiment, gaps (grooves) generated at joints between members (joint portions) can be reduced as compared with a casing having a three-piece structure often adopted in an existing apparatus. Therefore, a cleaning work such as disinfection using disinfectant and ultraviolet sterilization can be efficiently performed. Further, rigidity of the casing can be easily improved.

Battery Mounted Structure

Figure 3:
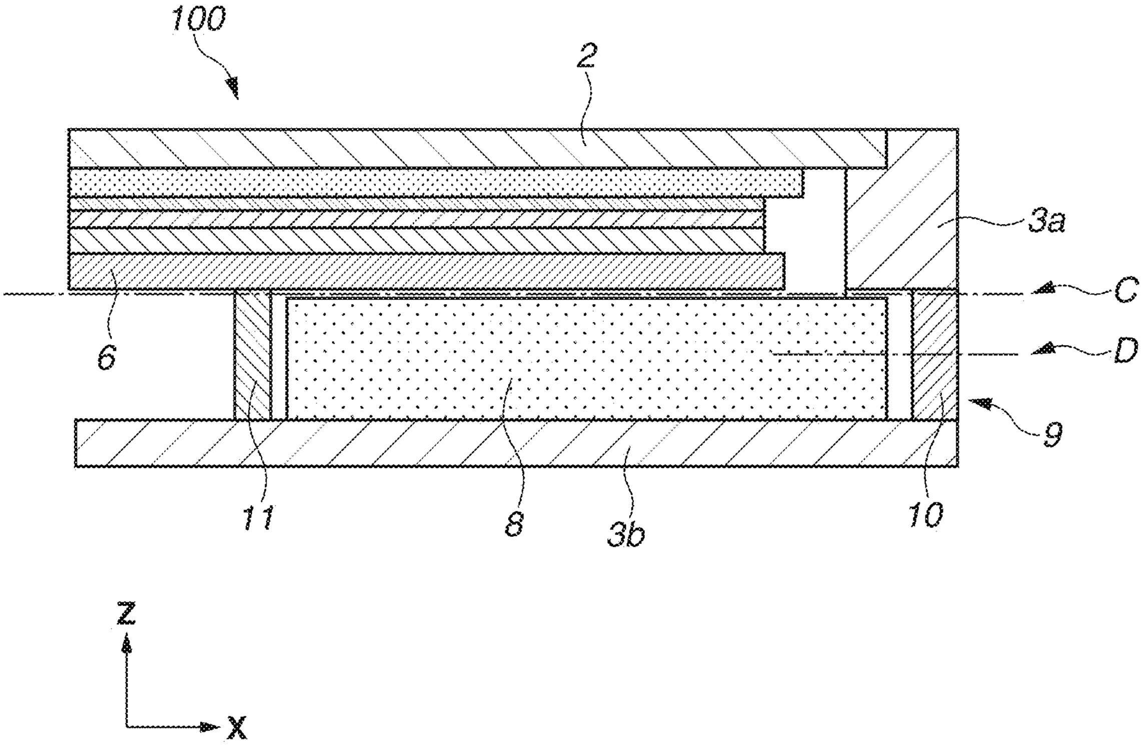
FIG. 3 is a cross-sectional view of the radiation imaging apparatus taken along line B-B of FIG. 1A.
Figure 4:
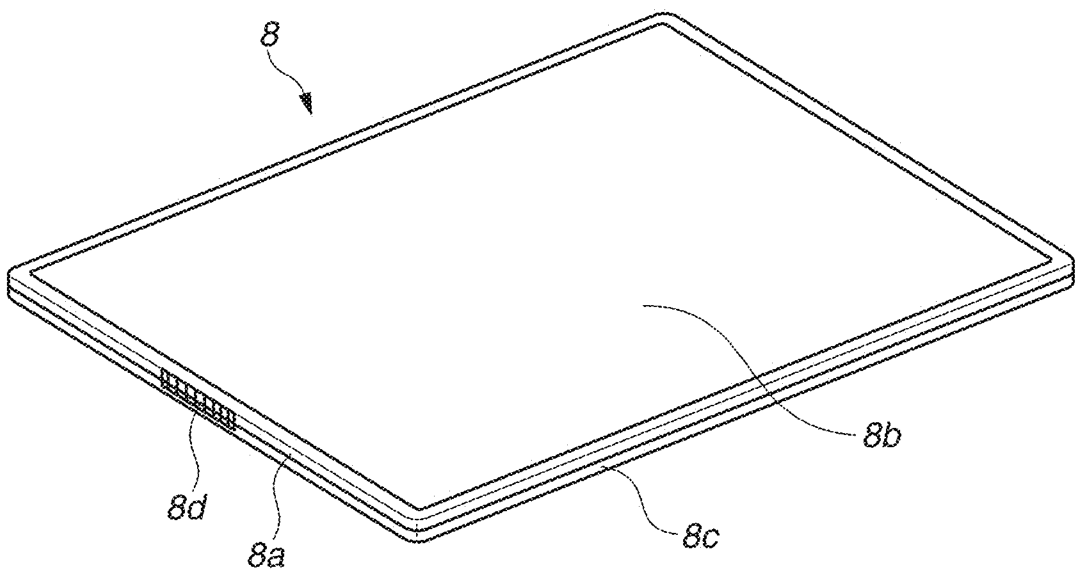
FIG. 4 is a diagram illustrating an appearance of a battery.

FIG. 3 is a cross-sectional view of the radiation imaging apparatus taken along line B-B of FIG. 1A. FIG. 4 is a diagram illustrating an appearance of the battery.

An opening 9 for insertion/removal of the battery 8 into/from the casing is provided at least one of the four side surface portions 3*a* of the rear surface casing 3. Further, an openable/closable opening cover 10 (lid member) is disposed so as to cover the opening 9. In the present exemplary embodiment, the opening 9 and the opening cover 10 each have a rectangular shape; however, the shapes of them are not limited thereto. The opening 9 and the opening cover 10 each may have a substantially rectangular shape, an elliptical shape, or the like, and the opening cover 10 may be separated from or integrated with the battery 8. In the present exemplary embodiment, the battery 8 has a substantially hexahedron shape as illustrated in FIG. 4. However, the shape of the battery 8 is not limited thereto, and for example, a width of the battery 8 on a terminal 8*d* side may be small so that the battery 8 is easily inserted into the opening 9. Further, the battery 8 may have a vertically asymmetric shape so as not to be erroneously mounted upside down. A seal member (not illustrated) is desirably disposed between the opening cover 10 and the opening 9. The seal member is desirably made of a rubber or a cushion material in order to prevent bodily fluids of the patient, antiseptic solution, and the like from entering the inside of the radiation imaging apparatus 100. Further, the opening 9 is present at a position higher than the installation surface due to the thickness of the rear surface portion 3*b*. Therefore, even when the radiation imaging apparatus 100 is placed on a dirty installation surface with some substance thereon, the substance may hardly enter the radiation imaging apparatus 100 from the opening 9. The seal member may be provided on any of the opening cover 10 and the opening 9.

The existing radiation imaging apparatus has a structure in which the battery 8 is inserted from a wide surface 8*b* side or a structure in which the wide surface 8*b* is exposed to the outside in a state where the battery 8 is mounted in many cases. In the case of such a structure, an opening through which the battery 8 is inserted needs to have a size corresponding to the wide surface 8*b*. Therefore, the size (total length) of a groove generated when the opening is covered with the opening cover is large.

In contrast, in the present exemplary embodiment, the battery 8 is inserted into the radiation imaging apparatus 100 from a short side surface 8*a* side, and the other surfaces of the battery 8 are not exposed to the outside in the state where the battery 8 is mounted. Therefore, it is sufficient for the opening 9 to have the size corresponding to the short side surface 8*a*. In addition, the size (perimeter or total length) of the groove generated when the opening 9 is covered with the opening cover 10 is small. This makes it possible to efficiently perform the cleaning work such as disinfection with disinfectant and ultraviolet sterilization. The battery 8 according to the present exemplary embodiment is mounted on a side close to the rear surface portion 3*b* in a Z-axis direction as illustrated in FIG. 3. More specifically, the battery 8 is disposed on a side opposite to the radiation detection panel 1 with the support base 6 interposed therebetween. Further, the battery 8 is mounted so as to overlap with the radiation detection panel 1 in an X-axis direction in FIG. 3. In other words, the battery 8 can be mounted in a space defined by the size of the radiation detection panel 1 without securing an additional space in the X-axis direction, which makes it possible to prevent the size of the radiation imaging apparatus 100 from being increased in the X-axis direction. Accordingly, a center line D of the opening 9 in the Z-axis direction is at a position close to the rear surface portion 3*b* relative to a center line C of the radiation imaging apparatus 100 in the Z-axis direction. Further, to secure the space where the battery 8 is mounted, the support base 6 is disposed on the incident surface 2 side of the center line C.

Figure 5:
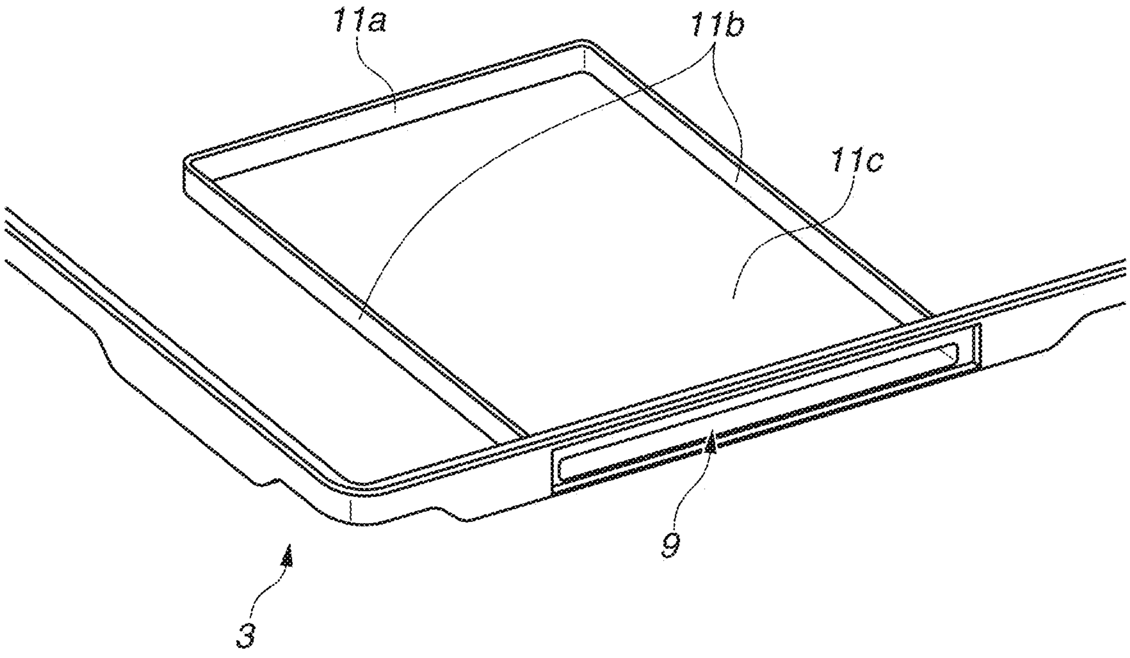
FIG. 5 is a diagram illustrating a battery housing portion.
Figure 6:
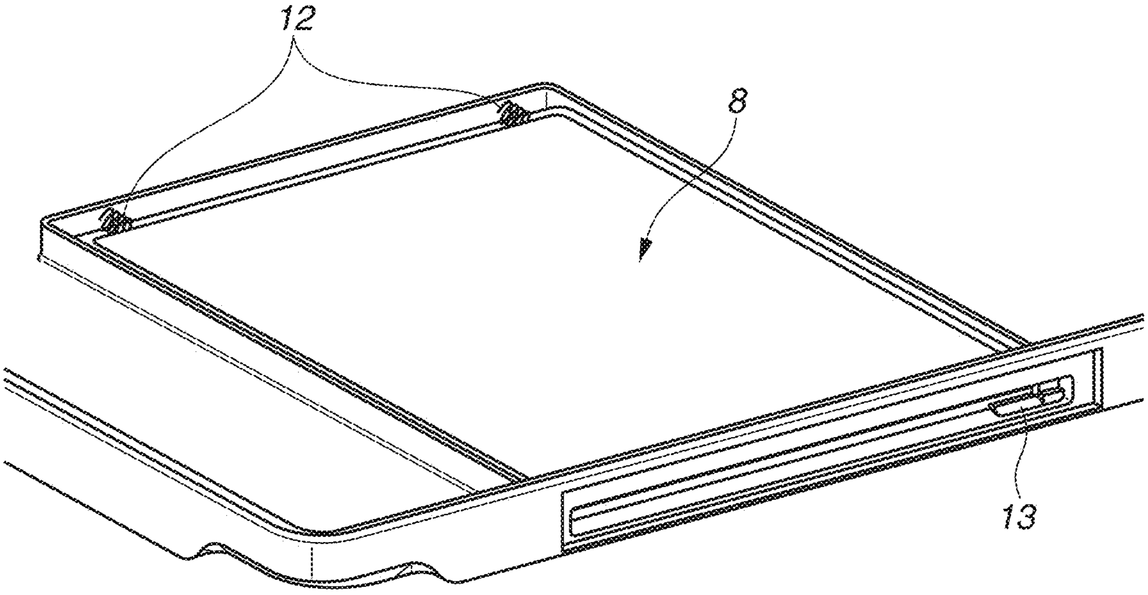
FIG. 6 is a diagram illustrating a state where the battery is mounted in the battery housing portion.
Figure 7A:
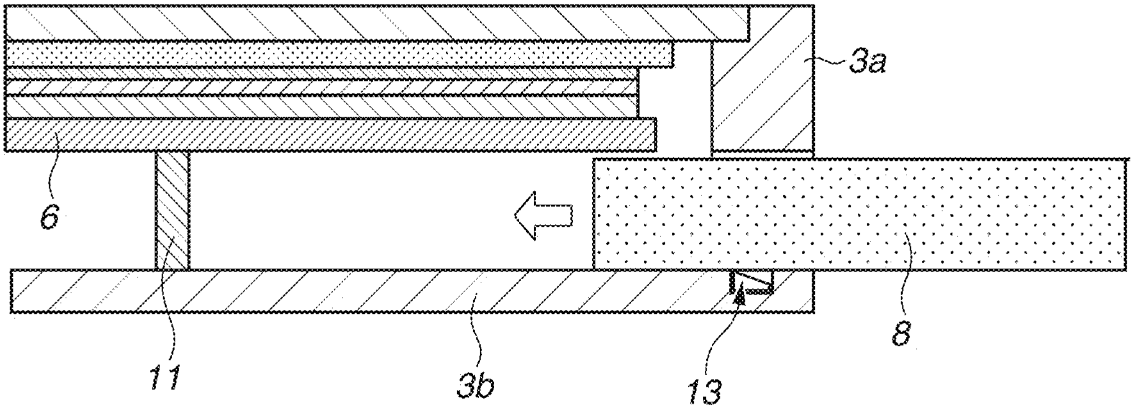
FIG. 7A is a diagram illustrating a state where the battery is being inserted.
Figure 7B:
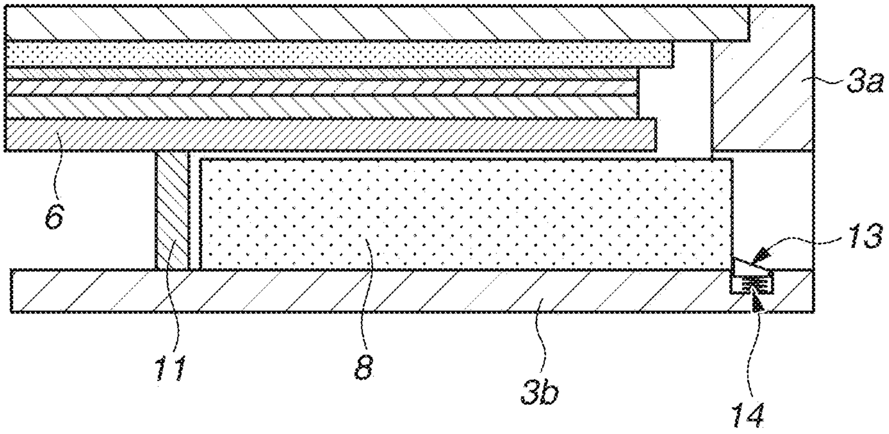
FIG. 7B is a diagram illustrating a state where the battery is mounted.

FIG. 5 is a diagram illustrating a battery housing portion. FIG. 6 is a diagram illustrating a state where the battery is mounted in the battery housing portion. FIG. 7A is a diagram illustrating a state where the battery is being inserted. FIG. 7B is a diagram illustrating a state where the battery is mounted.

A housing portion 11 (battery housing portion) includes the opening 9 and a plurality of reinforcing ribs disposed in a vicinity of the opening 9. The plurality of reinforcing ribs includes a short rib 11*a* holding the short side surface 8*a* of the battery 8, long ribs 11*b* holding long side surfaces 8*c* of the battery 8, and holder surfaces 11*c* (one of the holder surfaces 11*c* is not illustrated) holding two side surfaces 8*b* of the battery 8. The opening 9 of the housing portion 11 is desirably integrated with the rear surface casing 3 in terms of securing a region for the side surface portions 3*a* and sealability, but may not necessarily be integrated with the rear surface casing 3. The short rib 11*a*, the long ribs 11*b*, and the holder surfaces 11*c* may be integrated with the rear surface casing 3, a part thereof may be provided as a separate member or integrated with the support base 6. The short rib 11*a* and the long ribs 11*b* can hold the battery 8 and improve rigidity of the casing around the opening 9 lowered due to the opening 9. The holder surfaces 11*c* are desirably made of a material having small friction resistance against the wide surfaces 8*cb* of the battery 8 in order to reduce contact resistance with the wide surfaces 8*b* at insertion/removal of the battery 8 to facilitate smoothly insertion/removal of the battery 8.

Subsequently, a disposed position of the battery 8 is described. As illustrated in FIG. 3, the battery 8 is disposed between the radiation detection panel 1 and the rear surface portion 3*b*. Further, the battery 8 is disposed between the rear surface portion 3*b* and a region of the side surface portion 3*a* where the opening 9 is not disposed in the Z-axis direction.

If the battery 8 is disposed between the radiation detection panel 1 and the rear surface portion 3*b*, it is possible to suppress an increase in the size and the weight of the radiation imaging apparatus 100, thereby preventing lowering of portability and workability of the radiation imaging apparatus 100. Further, if the battery 8 is disposed between the rear surface portion 3*b* and a protruding portion of the side surface portion 3*a* that protrudes towards the inner side, it is possible to suppress lowering of the load capacity of the radiation imaging apparatus 100. More specifically, the battery disposed between the rear surface portion 3*b* and the protruding portion of the side surface portion 3*a* can receive a part of the load from the side surface portion 3*a*. Therefore, in a case where a load is applied from the incident surface 2 side, for example, in a case where a load is applied due to the patient stepping on the radiation imaging apparatus 100, the housing portion 11 distributes the load. This makes it possible to suppress lowering of the load capacity.

In a case where the opening 9 is provided in one of the side surface portions 3*a*, it is anticipated that removal of the mounted battery 8 is difficult because the width of the opening 9 is narrow. Therefore, in the present exemplary embodiment, as illustrated in FIG. 6, urging springs 12 are disposed on an innermost side (corresponding to short rib 11*a*) of the mounting region of the battery 8. When the battery 8 is pushed in to mount the battery 8 in the mounting region, urging force is applied to the urging springs 12. Therefore, when the mounted state is released, the battery 8 pops out due to the urging springs 12, and the user can easily hold and take out the battery 8. As a mechanism for applying the urging force, a spring and a rubber are usable; however, the mechanism is not limited thereto.

Subsequently, a mechanism for restraining the battery 8 receiving the urging force is described. Various methods are usable as the mechanism for restraining the battery 8, and a battery lock 13 is used as an example in the present exemplary embodiment. FIG. 7A is a cross-sectional view illustrating a state where the battery is being mounted, and FIG. 7B is a cross-sectional view illustrating a state where the battery is mounted. The battery lock 13 is connected to a spring 14. When the battery 8 is inserted into the housing portion 11, an inclined surface of the battery lock 13 formed on the exterior surface side is pushed by the battery 8, and as a result, the battery lock 13 is retracted in the rear surface portion 3*b* so as not to inhibit insertion of the battery 8. After the battery 8 is completely mounted, the battery lock 13 is pushed back by the urging force of the spring 14, thereby restraining and preventing the battery 8 from popping out. To take out the battery 8, on the other hand, the user pushes the battery lock 13 in using their finger so that the battery 8 pops out due to the urging force of the urging springs 12.

Effects

As described above, in the radiation imaging apparatus 100 according to the first exemplary embodiment, the groove caused by the joints of members is not generated on an outer surface of the rear surface portion 3*b* (bottom surface) while the battery replacement is possible.

Therefore, it is possible to efficiently perform the cleaning work such as disinfection and sterilization on the radiation imaging apparatus 100.

In the first exemplary embodiment, the structure in which the groove caused by the joints of members is not generated on the rear surface portion 3*b* (bottom surface) is described. In a second exemplary embodiment, a structure including concave/convex portions on the rear surface portion 3*b* (bottom surface) within a range not hindering the cleaning work is described. Various kinds of components described in the second exemplary embodiment are similar to the components in the first exemplary embodiment except for portions relating to the foregoing features. Therefore, similar components are denoted by the same reference numerals, and detailed description thereof is omitted.

A radiation imaging apparatus according to the second exemplary embodiment is described with reference to FIGS. 8A, 8B and 9.

Figure 8A:
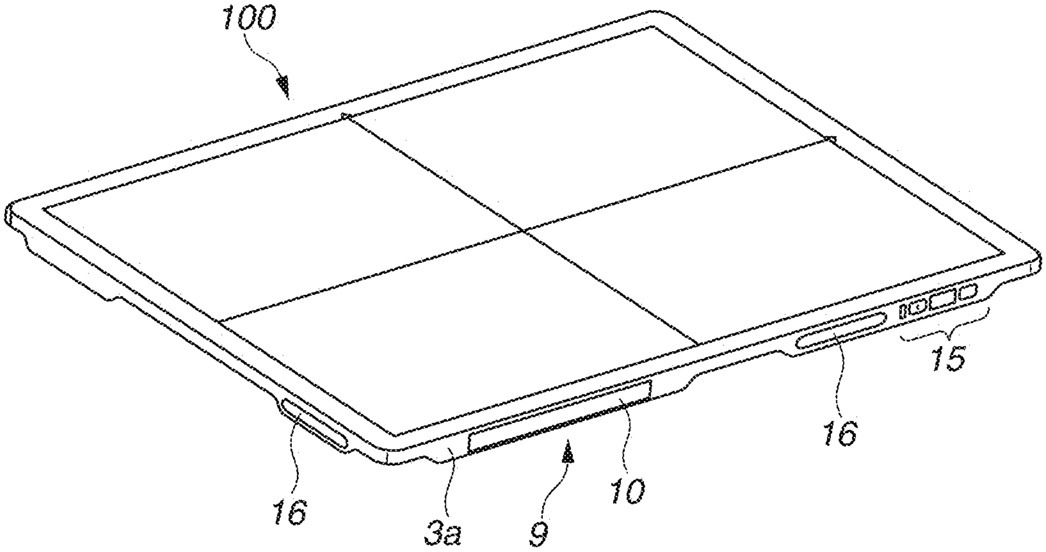
FIG. 8A is a perspective view illustrating the top surface side of the radiation imaging apparatus.

FIG. 8A is a perspective view illustrating a top surface side of the radiation imaging apparatus. FIG. 8B is a perspective view illustrating a bottom surface side of the radiation imaging apparatus. FIG. 9 is a diagram illustrating a disposed position of a battery housing portion.

Figure 8B:
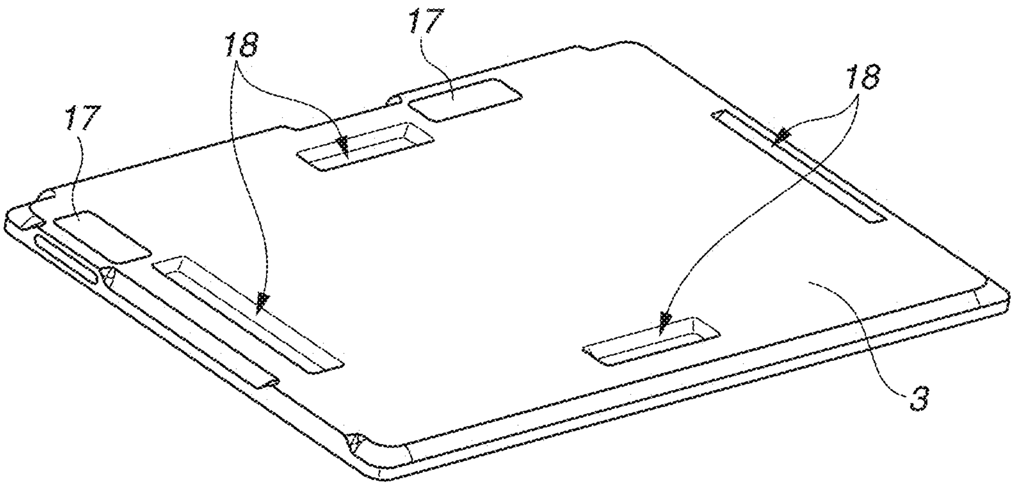
FIG. 8B is a perspective view illustrating the bottom surface side of the radiation imaging apparatus.
Figure 9:
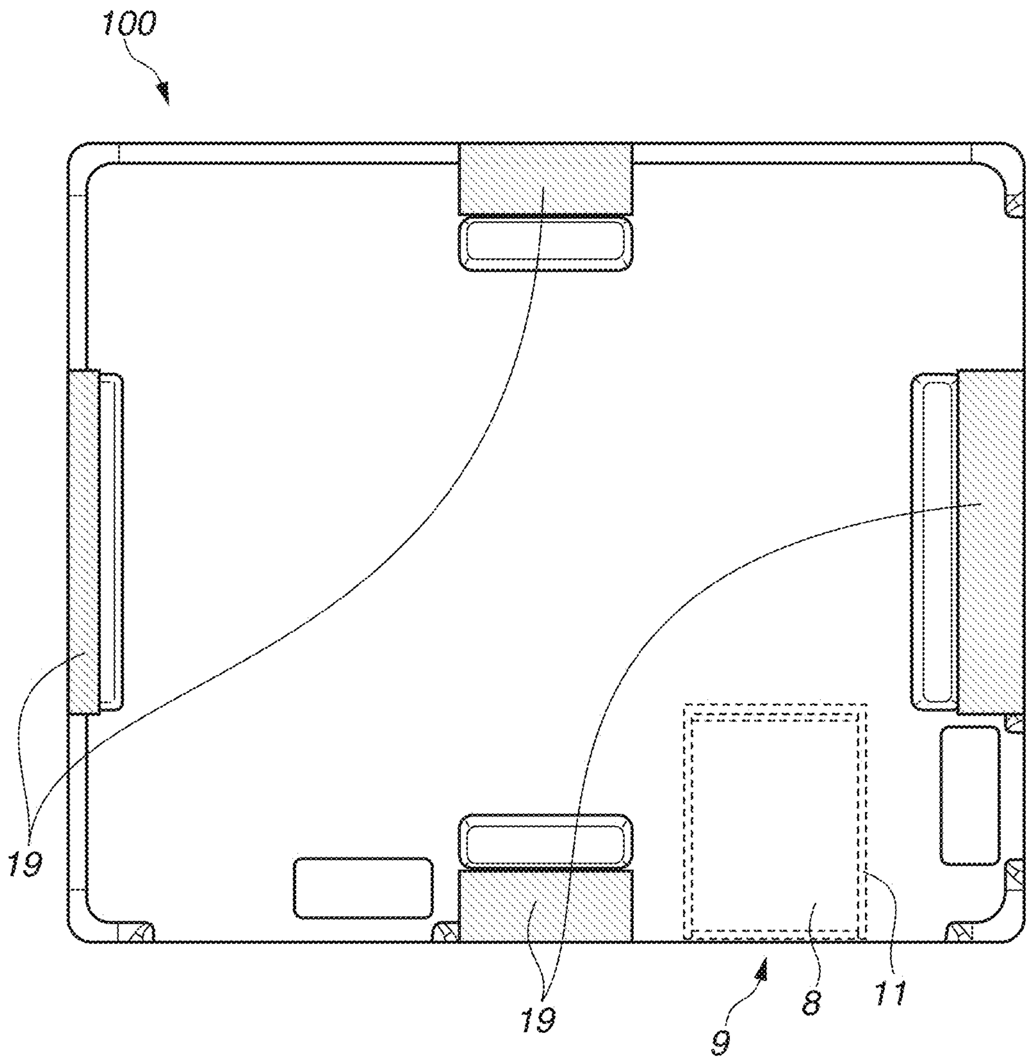
FIG. 9 is a diagram illustrating a relationship between the battery housing portion and holding portions.

As illustrated in FIGS. 8A and 8B, side-surface antenna windows 16 are provided on the side surface portions 3*a* of the rear surface casing 3, and rear-surface antenna windows 17 are provided on the rear surface portion 3*b* of the rear surface casing 3. In a case where the rear surface casing 3 is made of a metal (conductive member), the rear surface casing 3 blocks radio waves emitted from an antenna (not illustrated) of a wireless communication unit provided in the radiation imaging apparatus 100. Therefore, to enable wireless communication with an external apparatus, the side-surface antenna windows 16 and the rear-surface antenna windows 17 are non-conductive members made of a resin material. The rear-surface antenna windows 17 are not provided with any covers like the opening cover 10 attached to the opening 9. The rear-surface antenna windows 17 are resin members attached to openings in the rear surface casing 3 made of a metal and each having a size not generating a gap, and have sufficient waterproof performance. The members that have sufficient waterproof performance and are subjected to processing so as to generate no groove as described above are determined to hardly affect cleaning. Thus, such members may be disposed on the rear surface portion 3*b*. The side-surface antenna windows 16 may not be provided, and only the rear-surface antenna windows 17 may be provided. However, if it is not necessary to provide the rear-surface antenna windows 17 on the rear surface portion 3*b*, the rear-surface antenna windows 17 are desirably not provided. Therefore, only the side-surface antenna windows 16 may be provided, and the rear-surface antenna windows 17 may not be provided.

As illustrated in FIG. 8B, in a case where an outer periphery of the rear surface portion 3*b* of the rear surface casing 3 is regarded as quadrilateral in shape, holding portions 18 are provided near respective sides. The holding portions 18 are recesses recessed from the rear surface portion 3*b* toward the incident surface 2, and are formed integrally with other portions of the rear surface casing 3. Each of the holding portions 18 desirably has dimensions that allow the user's finger to hook a side wall of the holding portion 18 on the outer periphery side when the radiation imaging apparatus 100 is held from the sides. Therefore, a distance between the outer periphery of the rear surface portion 3*b* and a position of each holding portion 18 closest to the outer periphery is desirably set to 25 mm to 40 mm.

Each of the holding portions 18 desirably has a depth allowing the user's finger to reach the bottom, and the depth is desirably set to, for example, 5.0 mm to 8.0 mm. Further, each of the holding portions 18 desirably has a width (transverse-direction length) allowing insertion of the user's finger, and the width is desirably set to, for example, 15 mm to 30 mm. A longitudinal length of each of the holding portions 18 is greater than the width. With such a configuration, even if inside of any of the holding portions 18 is contaminated, the user can clean the holding portion 18 sufficiently by pushing in paper, cloth, or the like using the finger.

In a case where the holding portions 18 are formed by denting the rear surface portion 3*b*, an internal space of the casing 101 is reduced at portions where the holding portions 18 are provided. Thus, it is difficult to form the housing portion 11 so as to overlap with the holding portions 18. Therefore, as illustrated in FIG. 9, the housing portion 11 including the battery 8 and the opening 9 is not provided in regions 19 connecting the holding portions 18 and the sides closest to the respective holding portions 18. In other words, the housing portion 11 is provided outside the regions 19. Further, the housing portion 11 is desirably arranged with intervals from the regions 19. This makes it possible to prevent, when the user grips the holding portions 18 to hold the radiation imaging apparatus 100, the hands of the user from interfering with the opening cover 10 attached to the opening 9. As a result, it is possible to prevent the opening cover 10 and the battery 8 from unexpectedly falling off, and to improve workability during transportation or a positional adjustment work of the radiation imaging apparatus 100.

Further, as illustrated in FIG. 8A, a user interface portion 15 is provided on the side surface portion 3*a* provided with the opening 9 for insertion/removal of the battery 8. The user interface portion 15 includes a battery display portion indicating a power switch for switching power supply of the radiation imaging apparatus 100 a residual charging amount of the battery 8, and a ready display portion indicating a ready switch for switching an operation state of an imaging unit and a state of the imaging unit. The configuration of the user interface portion 15 is not limited thereto, a part of the configuration may be omitted, or the user interface portion 15 may include an additional configuration.

If the opening 9 and the user interface portion 15 are provided on the side surface portion 3*a* on the same side, workability can be improved because the user can check the residual charging amount of the battery 8 and the state of the power supply and perform replacement of the battery 8 at the same time. In the case where the opening 9 and the user interface portion 15 are provided on the side surface portion 3*a* on the same side, the opening 9 and the user interface portion 15 are disposed on opposite sides with the holding portion 18 interposed therebetween. In other words, the opening 9 and the user interface portion 15 are disposed on one side and the other side of a center in the longitudinal direction. In a case where the holding portions 18 are formed to face the center positions of the closest sides in consideration of easiness of holding the holding portions 18, the holding portions 18 are designed in the above-described manner in consideration of spaces. However, arrangement of the opening 9 and the user interface portion 15 is not limited thereto. The opening 9 and the user interface portion 15 may be provided on the side surface portions 3*a* on the different sides, or the opening 9 may be provided not on the side surface portion 3*a* on the side in the longitudinal direction but on the side surface portion 3*a* on the side in the transverse direction.

In a case where the radiation imaging apparatus 100 is used while being mounted on a stand, the rear surface portion 3*b* of the radiation imaging apparatus 100 cannot be accessed because the rear surface portion 3*b* is normally installed on the installation surface. Thus, in the case of the existing configuration in which the battery is mounted on the rear surface portion 3*b*, the battery cannot be replaced unless the radiation imaging apparatus 100 is demounted from the stand. In contrast, in the radiation imaging apparatus 100 according to the present exemplary embodiment, the battery 8 can be replaced from the side. Therefore, the battery 8 can be replaced in the state where the radiation imaging apparatus 100 is mounted on the stand.

Effects

As described above, in the radiation imaging apparatus 100 according to the second exemplary embodiment, the components can be arranged on the rear surface portion **3*b* (bottom surface) so as not to inhibit cleaning while the battery replacement is possible. Therefore, the cleaning work such as disinfection and sterilization can be efficiently performed on the radiation imaging apparatus 100** according to the present exemplary embodiment.

In the first and second exemplary embodiments, the housing portion 11 formed integrally with the rear surface casing 3 is described. In a third exemplary embodiment, a battery holder 20 formed of a member separated from the rear surface casing 3 is described. Various kinds of components described in the third exemplary embodiment are similar to the components in the first and second exemplary embodiments except for portions relating to the foregoing features. Therefore, similar components are denoted by the same reference numerals, and detailed description thereof is omitted.

The radiation imaging apparatus discussed in Japanese Patent Application Laid-Open No. 2012-181238 has room for improvement in terms of battery protection. This is because the radiation imaging apparatus discussed in Japanese Patent Application Laid-Open No. 2012-181238 has a structure in which a battery is exposed on its rear surface side, and impact may be transmitted to the battery at the time of installing the radiation imaging apparatus on an installation surface and the battery may be damaged by the impact. Further, even in a case where the battery is simply covered on the rear surface portion, if impact is applied to the rear surface portion, the rear surface portion may be deformed, and the deformed rear surface portion may come into contact with the battery. As a result, the impact may be transmitted to the battery. The third exemplary embodiment is made in consideration of such issues, and is directed to a radiation detection apparatus that a power supply can be attached to and detached from and can prevent external impact from being transmitted to the power supply.

Figure 13:
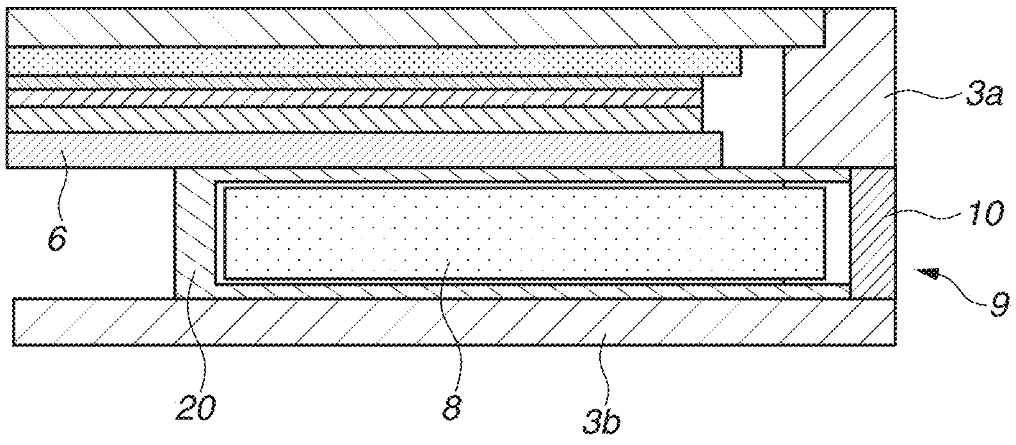
FIG. 13 is a cross-sectional view of the radiation imaging apparatus taken along line B-B of FIG. 1A.
Figure 14:
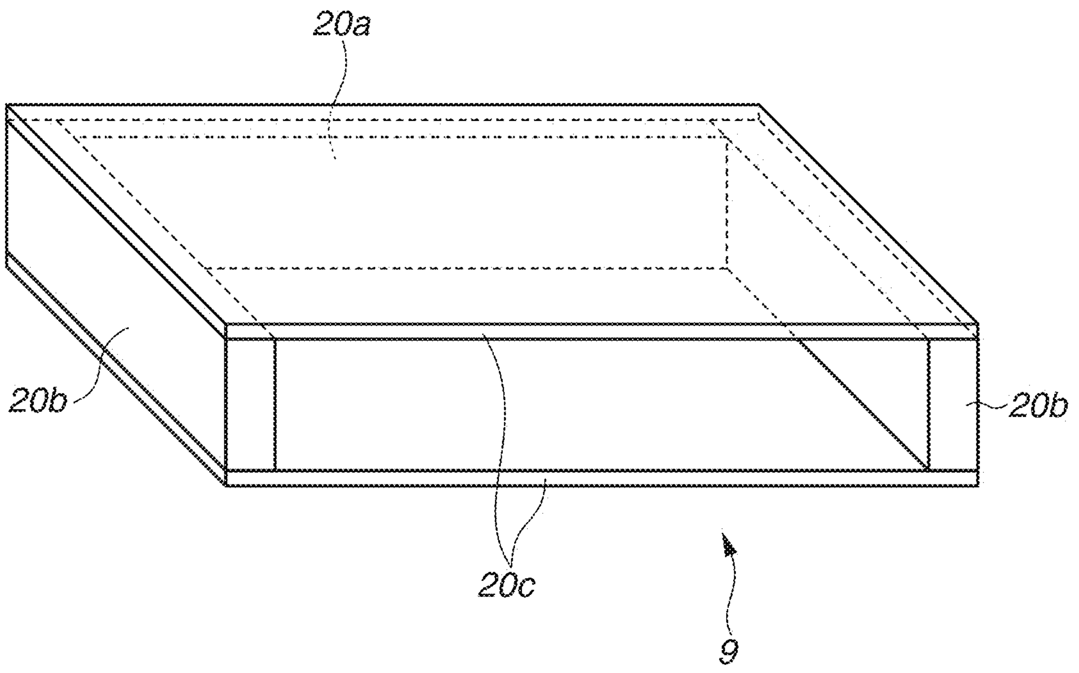
FIG. 14 is a diagram illustrating a battery holder.

The battery holder 20 for holding the battery 8 is described with reference to FIGS. 13 and 14. FIG. 14 is an external view illustrating the battery holder 20 alone. The battery holder 20 is a member (holding member) independent of the casing 101. The battery holder 20 includes the opening 9, and is formed by includes holder side surface portions **20*a* and 20*b*, and holder upper/lower surface portions 20*c* as a general term for a holder upper surface portion and a holder lower surface portion (one of the surfaces is illustrated as transparent surface). The battery holder 20 supports and holds the battery 8 by all of the surfaces except for the surface provided with the opening 9, and protects the battery 8 from external impact. To secure a space for insertion/removal of the battery 8, the holder upper/lower surface portions 20*c* each may have a thickness thinner than a thickness of each of the holder side surface portions 20*a* and 20*b*. The holder side surface portions 20*a* and 20*b* and the holder upper/lower surface portions 20*c* may be integrated together or separated from each other, and may be made of the same material or different materials. Further, the holder upper/lower surface portions 20*c* may be made of the same material or different materials. As the material, for example, a resin, a polyethylene terephthalate (PET) resin, or polycarbonate-acrylonitrile butadiene styrene (PC-ABS) is used. These materials are desirable in terms of securing strength, weight reduction, and sliding properties, but any other materials may be used. A seal member (not illustrated) is desirably disposed between the opening cover 10 and the opening 9. The seal member is desirably made of a rubber or a cushion material in order to prevent bodily fluids of the patient, disinfectant, and the like from entering the inside of the radiation imaging apparatus 100. Further, the opening 9 is located at a position higher than the installation surface due to the thickness of the rear surface portion 3*b*. Therefore, even when the radiation imaging apparatus 100 is placed on a dirty installation surface, contaminant may hardly enter the radiation imaging apparatus 100 from the opening 9. The seal member may be provided on any of the opening cover 10 and the opening 9. The seal member desirably has waterproof performance to prevent water from entering between the opening cover 10 and the battery holder 20. It is desirable to secure waterproof performance between the opening cover 10 and the battery holder 20 so that the casing 101** can be entirely made watertight.

The battery holder 20 is required to protect the battery 8. Thus, even in a case where the casing 101 is deformed by impact from outside, the battery holder 20 desirably prevents the impact from being transmitted to the battery 8. To do so, as the holder upper/lower surface portions **20*c*, rigid members having strength enough to receive the impact or flexible members that can absorb and disperse the impact are desirably used. A gap may be provided between the battery holder 20 and the rear surface portion 3*b* to cause the battery holder 20 to be hardly affected by deformation of the casing 101**.

Figure 15A:
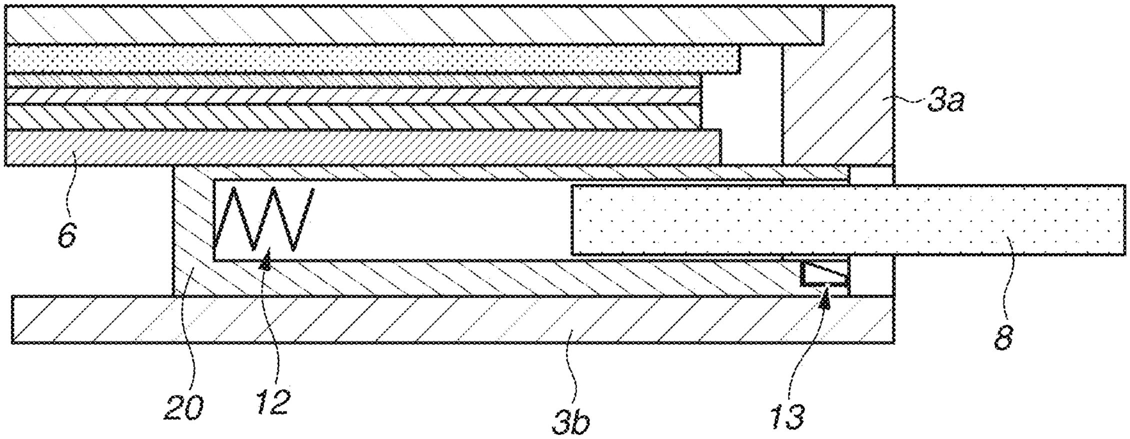
FIG. 15A is a diagram illustrating a state where the battery is being inserted.
Figure 15B:
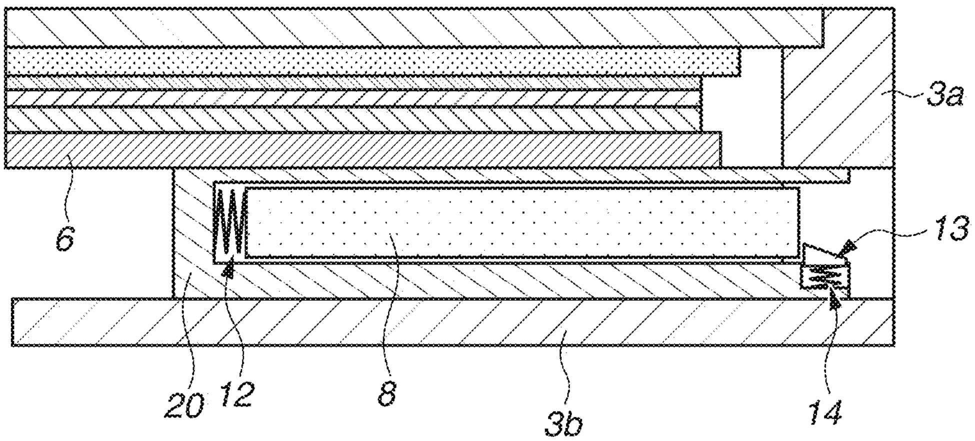
FIG. 15B is a diagram illustrating a state where the battery is mounted.

As in the first exemplary embodiment, the urging springs 12 may be provided. As illustrated in FIGS. 15A and 15B, the urging springs 12 are disposed on an innermost side (corresponding to the holder side surface portion **20*a*) of the mounting region of the battery 8. FIG. 15A is a diagram illustrating a state where the battery is being inserted. FIG. 15**B is a diagram illustrating a state where the battery is mounted.

Effects

As described above, in the radiation imaging apparatus 100 according to the third exemplary embodiment, the battery 8 can be inserted into and removed from the side of the casing 101. Further, the battery 8 can be protected from external impact. Furthermore, even in a case where the battery holder 20 is damaged for the purpose of protecting the battery 8, the battery holder 20 can be easily replaced because the battery holder 20 is a member independent of the rear surface casing 3.

Further, in the radiation imaging apparatus 100 according to the third exemplary embodiment, the battery 8 can be inserted into and removed from the side of the casing 101. Further, the battery 8 can be protected from external impact. Furthermore, even in the case where the battery holder 20 is damaged for the purpose of protecting the battery 8, the battery holder 20 can be easily replaced because the battery holder 20 is a member independent of the rear surface casing 3.

In the third exemplary embodiment, the example in which the battery 8 is protected by the battery holder 20 is described. In a fourth exemplary embodiment, an example in which the battery 8 is protected by a reinforcing rib of the housing portion 11 in addition to the battery holder 20 is described. Various kinds of components described in the fourth exemplary embodiment are similar to the components in the third exemplary embodiment except for portions relating to the foregoing features. Therefore, similar components are denoted by the same reference numerals, and detailed description thereof is omitted.

Figure 16A:
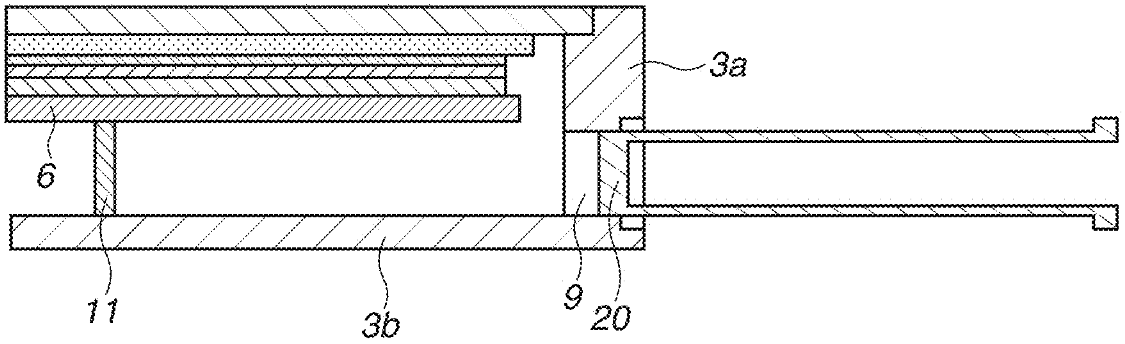
FIG. 16A is a diagram illustrating a state where the battery holder is being inserted.
Figure 16B:
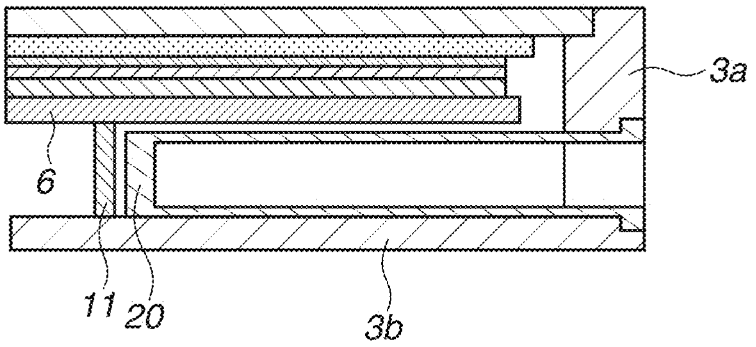
FIG. 16B is a diagram illustrating a state where the battery holder is mounted.

FIGS. 16A and 16B are diagrams illustrating the reinforcing rib. As illustrated in FIGS. 16A and 16B, the radiation imaging apparatus 100 according to the fourth exemplary embodiment includes the housing portion 11 in the casing 101. The housing portion 11 (battery holder housing portion) is a structure for protecting the battery 8 and the battery holder 20. The reinforcing rib has a U-shape including a portion that reinforces the region of the battery holder 20 on the short side surface 20*a* side and portions that hold the regions of the battery holder 20 on the long side surfaces 20*b*. A height of the reinforcing rib of the housing portion 11 is greater than a thickness of the battery holder 20, and external force applied to the casing 101 can be received not by the battery holder 20 but by the reinforcing rib. The reinforcing rib of the housing portion 11 may be integrated with the rear surface casing 3, or may be integrated with the support base 6. In the fourth exemplary embodiment, not only the battery 8 but also the battery holder 20 together with the battery 8 can be inserted into and removed from the side of the casing 101. FIG. 16A is a diagram illustrating a state where the battery holder 20 is being inserted. FIG. 16B is a diagram illustrating a state where the battery holder 20 is mounted. To mount the battery holder 20 on the rear surface casing 3, the rear surface casing 3 includes the opening 9. The battery holder 20 is freely attachable to and detachable from the rear surface casing 3, which facilitates cleaning and replacement of the battery holder 20. After the battery holder 20 is inserted into a housing space surrounded by the reinforcing rib of the housing portion 11, the battery holder 20 is desirably fixed to the rear surface casing 3. As an example of a fixing method, screw fastening and a fixing method using a fixing member such as a double-sided tape are usable; however, the fixing method is not limited thereto.

Effects

As described above, in the radiation imaging apparatus 100 according to the fourth exemplary embodiment, the battery 8 and the battery holder 20 can be inserted into and removed from the side of the casing 101. The impact from outside can be received by the reinforcing rib of the housing portion 11, and the battery 8 and the battery holder 20 can be protected.

In the fourth exemplary embodiment, the example in which the battery 8 and the battery holder 20 are protected by the reinforcing rib of the housing portion 11 is described. In a fifth exemplary embodiment, an example in which the battery holder 20 and the battery 8 are protected using the holding portions 18 provided for other purposes is described. Various kinds of components described in the fifth exemplary embodiment are similar to the components in the third and fourth exemplary embodiments except for portions relating to the foregoing features. Therefore, similar components are denoted by the same reference numerals, and detailed description thereof is omitted.

Figure 17:
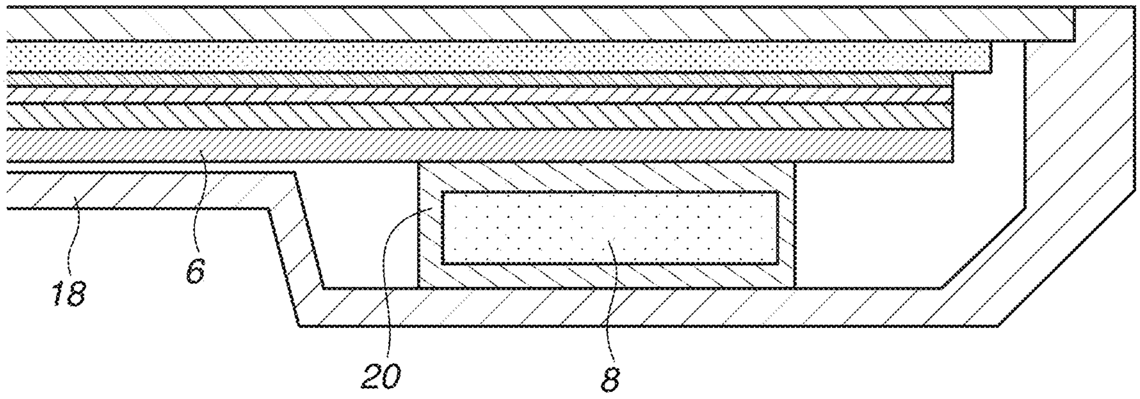
FIG. 17 is a cross-sectional view of the radiation imaging apparatus.

FIG. 17 is a diagram illustrating a relationship between the battery housing portion and one of the holding portions. As illustrated in FIG. 17, the holding portion 18 is formed by deeply denting the rear surface portion 3*b* toward the incident surface 2 (toward support base 6). FIG. 17 is a cross-sectional view of the radiation imaging apparatus 100. An inner surface of the holding portion 18 faces the support base 6 with a very small space therebetween. In such a configuration, when a load is applied to the radiation imaging apparatus 100, the rear surface portion 3*b* is deformed, and the inner surface of the holding portion 18 and the support base 6 come into contact with each other. Thus, the load can be distributed, and impact to be transmitted to the battery 8 and the battery holder 20 can be reduced. To sufficiently achieve the effect of the load distribution, the thickness of the battery 8 is desirably less than the depth of the holding portion 18.

Effects

As described above, in the radiation imaging apparatus 100 according to the fifth exemplary embodiment, the battery 8 and the battery holder 20 can be inserted into and removed from the side of the casing 101. Further, the impact from outside can be received by the holding portion 18, and the battery 8 and the battery holder 20 can be protected.

Other Exemplary Embodiments

The present disclosure is not limited to the above-described exemplary embodiments. Various modifications (including organic combinations of exemplary embodiments) can be made based on the gist of the present disclosure, and are not to be excluded from the scope of the present disclosure. In other words, configurations in which the above-described exemplary embodiments and modifications thereof are combined are all included in the present disclosure.

The disclosure of the exemplary embodiments includes the following configurations, methods, and the like.

Figure 11:
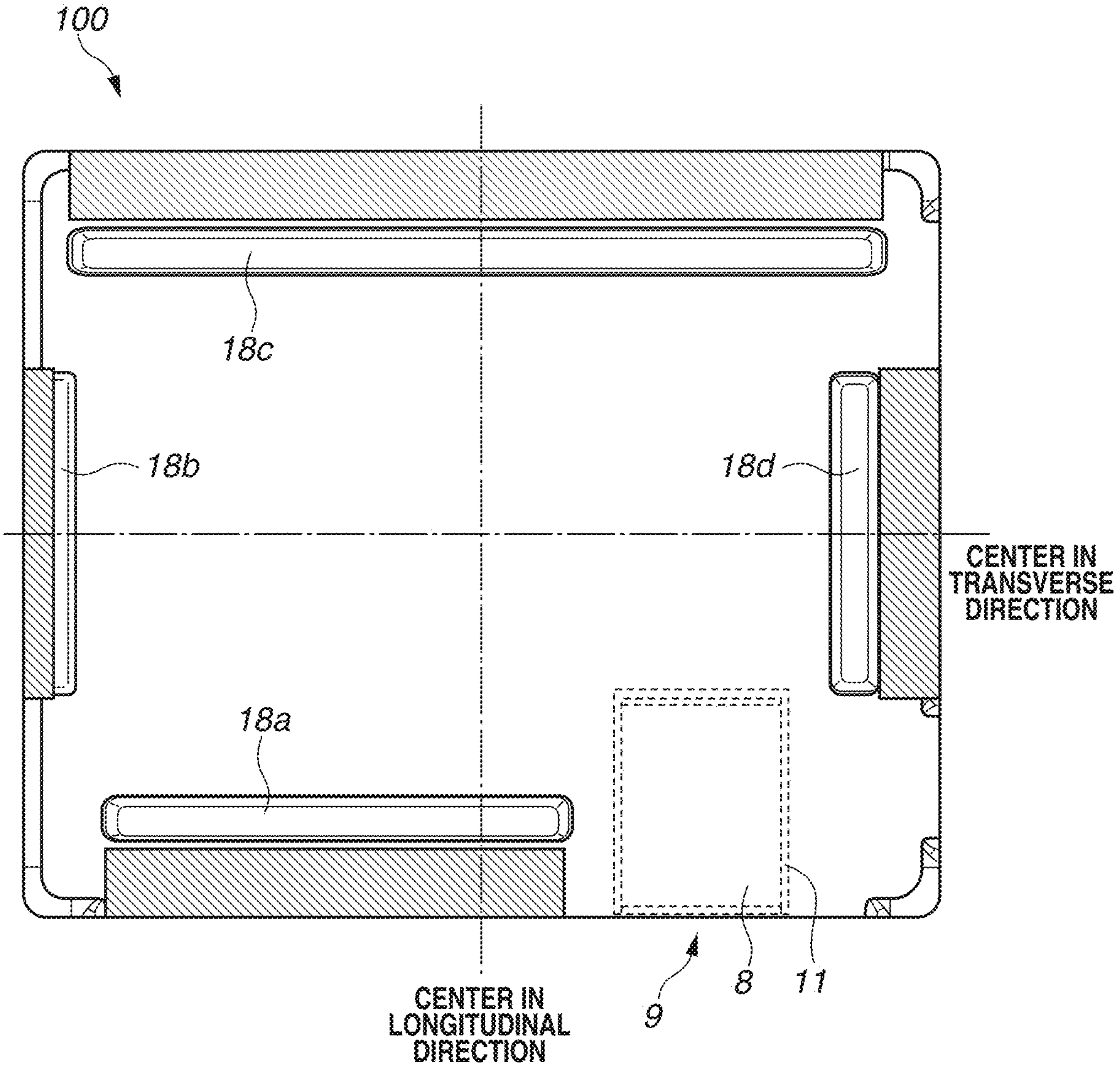
FIG. 11 is a diagram illustrating a relationship between the battery housing portion and holding portions.

In FIG. 8B, each of the holding portions 18 is provided to have its longitudinal length symmetrically based on a position facing the center position of the closest side; however, each of the holding portions 18 may not always be symmetric. FIG. 11 is a diagram illustrating a relationship between the battery housing portion and the holding portions. Giving priority to securing the space for the housing portion 11, a holding portion 18*a* may be provided so as to have a short length on a side provided with the housing portion 11 and a holding portion 18*a* may be provided so as to have a long length on a side opposite thereto, as illustrated in FIG. 11. Even in such a case, the holding portion 18 is desirably provided so as to face the center position of the closest side.

In FIG. 8B, the holding portion 18 formed on the side provided with the opening 9 and the holding portion 18 formed on the side facing that side have the same longitudinal length. However, as illustrated in FIG. 11, the rear surface portion 3*b* may be formed such that the holding portion 18*a* on the side provided with the opening 9 have a short longitudinal length, and the holding portion 18*c* on the side facing that side have a long longitudinal length.

Figure 12:
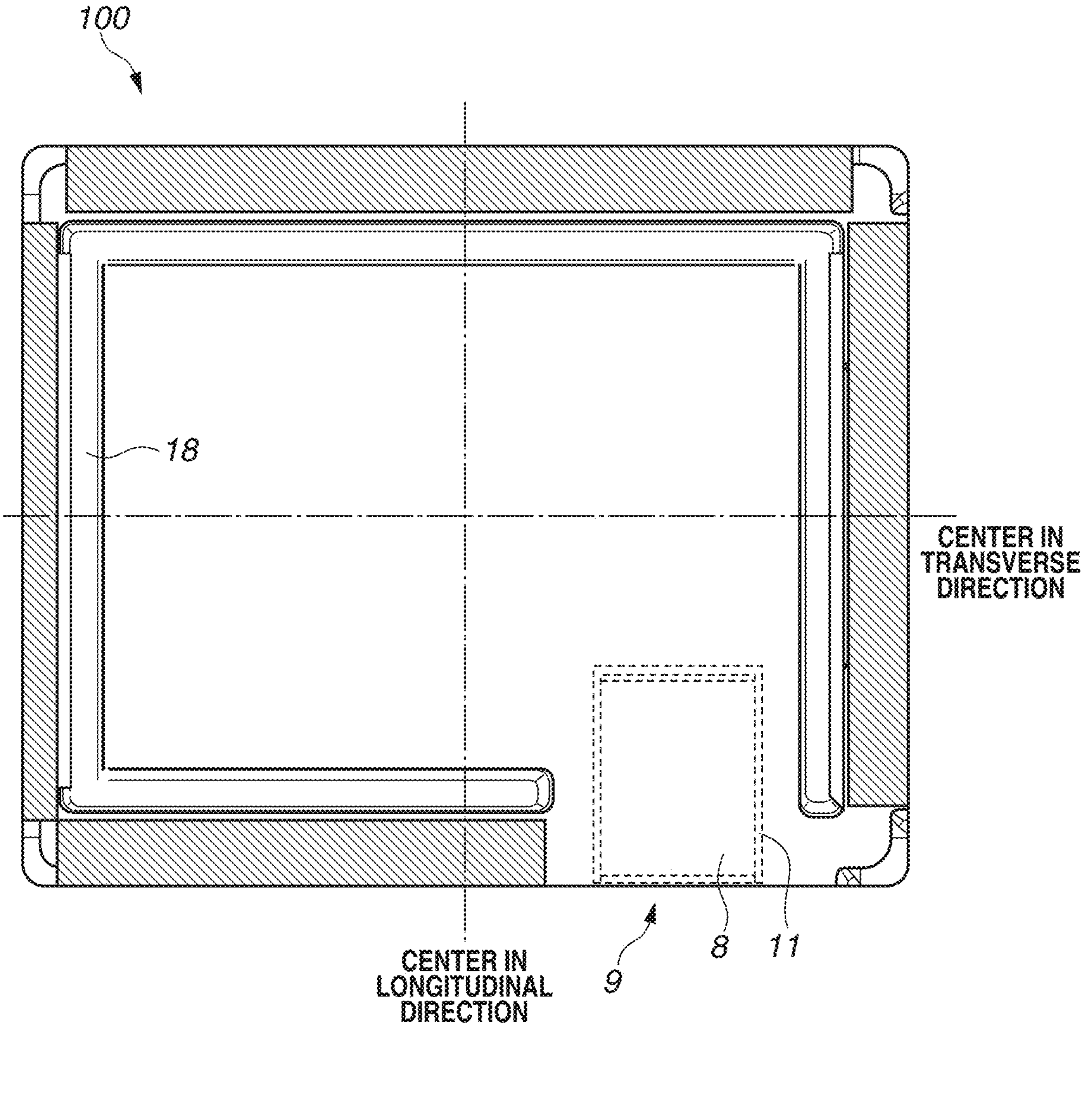
FIG. 12 is a diagram illustrating a relationship between the battery housing portion and a holding portion.

In FIG. 8B, one independent holding portion 18 is provided on each of the sides forming the outer periphery of the rear surface portion 3*b*; however, the shapes of the holding portions 18 are not limited thereto. FIG. 12 is a diagram illustrating a relationship between the battery housing portion and a holding portion. As illustrated in FIG. 12, a holding region having its longitudinal length along the plurality of sides may be formed as one holding portion 18. In a case where the holding portion 18 is formed in the foregoing manner, the holding portion 18 is not formed in the region where the housing portion 11 is provided. Alternatively, even when the holding portion 18 is formed in the region where the housing portion 11 is provided, the depth of the recess is shallower than the depth of the recess in the other region.

Supplements

The disclosure of the above-described exemplary embodiments includes the following configurations.

Configuration 1

A radiation imaging apparatus, comprising:
- a radiation detection panel configured to detect radiation;
- a built-in power supply configured to supply power to the radiation detection panel;
- a casing configured to house the radiation detection panel and the built-in power supply,
- wherein the casing includes a top surface portion allowing the radiation to enter the radiation detection panel, a bottom surface portion located on a side opposite to the top surface portion, and a side surface portion connecting the top surface portion and the bottom surface portion,
- wherein the side surface portion includes an opening through which the built-in power supply is inserted into and removed from the casing, and
- wherein an outer surface of the bottom surface portion includes no groove that is generated by joining a plurality of members.

Configuration 2

The radiation imaging apparatus according to configuration 1, wherein the casing internally includes a reinforcing rib in a vicinity of the opening.

Configuration 3

The radiation imaging apparatus according to configuration 2, wherein the reinforcing rib is a structure formed integrally with a member serving as the bottom surface portion, or a member fastened to the member serving as the bottom surface portion.

Configuration 4

The radiation imaging apparatus according to any one of configurations 1 to 3, wherein the bottom surface portion and the side surface portion are integrated as a single member and made of an alloy containing aluminum or magnesium or both.

Configuration 5

The radiation imaging apparatus according to any one of configurations 1 to 4, further comprising:
- a wireless communication unit configured to perform wireless communication and housed inside the casing; and
- a non-conductive member configured to transmit radio waves of the wireless communication unit and provided on the side surface portion.

Configuration 6

The radiation imaging apparatus according to any one of configurations 1 to 5, further comprising a lid member configured to close the opening.

Configuration 7

The radiation imaging apparatus according to any one of configurations 1 to 6, wherein, in a case where the side surface portion is regarded as a structure having four surfaces, a user interface is provided on a surface same as a surface provided with the opening.

Configuration 8

The radiation imaging apparatus according to configuration 7, wherein the user interface includes at least one of a display portion and an operation portion.

Configuration 9

The radiation imaging apparatus according to any one of configurations 1 to 8, wherein the built-in power supply is a battery or a capacitor.

Configuration 10

The radiation imaging apparatus according to any one of configurations 1 to 9, wherein the bottom surface portion includes a holding portion recessed toward the top surface portion.

Configuration 11

The radiation imaging apparatus according to configuration 10, wherein a distance from the holding portion to a closest side surface portion is 25 mm to 40 mm.

Configuration 12

The radiation imaging apparatus according to configuration 10 or 11, wherein the holding portion has a depth of 5.0 mm to 8.0 mm.

Configuration 13

The radiation imaging apparatus according to any one of configurations 10 to 2, wherein the holding portion has a transverse length of 15 mm to 30 mm.

Configuration 14

The radiation imaging apparatus according to any one of configurations 10 to 13, wherein, when an outer periphery of the bottom surface portion is as quadrilateral in shape, the holding portion has a longitudinal length along a side corresponding to the side surface portion provided with the opening.

Configuration 15

The radiation imaging apparatus according to any one of configurations 10 to 14, wherein the opening is provided in a region not facing the holding portion.

Configuration 16

The radiation imaging apparatus according to any one of configurations 10 to 15, wherein the opening and the holding portion are arranged with an interval therebetween in a direction along a side corresponding to the side surface portion provided with the opening.

Configuration 17

A radiation imaging apparatus, comprising:
- a radiation detection panel configured to detect radiation;

a built-in power supply configured to supply power to the radiation detection panel;

a wireless communication unit configured to perform wireless communication; and a casing configured to house the radiation detection panel and the built-in power supply, wherein the casing includes a top surface portion allowing the radiation to enter the radiation detection panel, a bottom surface portion located on a side opposite to the top surface portion, and a side surface portion connecting the top surface portion and the bottom surface portion, wherein the side surface portion includes an opening through which the built-in power supply is inserted and removed, wherein the bottom surface portion is formed by joining a conductive first member and a non-conductive second member transmitting radio waves of the wireless communication unit, and wherein an outer surface of the bottom surface portion includes no groove that is generated by joining a plurality of members, except for a predetermined joint portion where the first member and the second member are joined.

Configuration 18

A radiation detection apparatus, comprising:

a radiation detection panel configured to detect radiation;

a built-in power supply configured to supply power to the radiation detection panel;

a holding member configured to hold the built-in power supply; and a casing configured to house the radiation detection panel, the built-in power supply, and the holding member, wherein the casing includes a top surface portion allowing the radiation to enter the radiation detection panel, a bottom surface portion located on a side opposite to the top surface portion, and a side surface portion connecting the top surface portion and the bottom surface portion, wherein the side surface portion includes an opening through which the built-in power supply is inserted into and removed from the casing, and wherein the holding member is a member separated from the casing.

Configuration 19

The radiation detection apparatus according to configuration 18, wherein, in a state where the holding member is fixed to the casing, the holding member includes a holder upper surface portion and a holder lower surface portion extending along the top surface portion, and a holder side surface portion connecting the holder upper surface portion and the holder lower surface portion, and wherein the holder upper surface portion and the holder lower surface portion each have a thickness less than a thickness of the holder side surface portion.

Configuration 20

The radiation detection apparatus according to configuration 19, wherein the holder upper surface portion and the holder lower surface portion are separate parts from the holder side surface portion.

Configuration 21

The radiation detection apparatus according to configuration 19 or 20, wherein the holder upper surface portion and the holder lower surface portion are made of a same material.

Configuration 22

The radiation detection apparatus according to configuration 19 or 20, wherein the holder upper surface portion and the holder lower surface portion are made of different materials.

Configuration 23

The radiation detection apparatus according to any one of configurations 19 to 22, wherein the holder upper surface portion and the holder lower surface portion are made of a material same as a material of the holder side surface portion.

Configuration 24

The radiation detection apparatus according to any one of configurations 19 to 22, wherein the holder upper surface portion and the holder lower surface portion are made of a material different from a material of the holder side surface portion.

Configuration 25

The radiation detection apparatus according to any one of configurations 19 to 24, wherein the holder upper surface portion and the holder lower surface portion are made of a resin.

Configuration 26

The radiation detection apparatus according to configuration 25, wherein the holder upper surface portion and the holder lower surface portion are made of a polyethylene terephthalate (PET) resin.

Configuration 27

The radiation detection apparatus according to any one of configurations 19 to 26, wherein the holder upper surface portion and the holder lower surface portion have flexibility.

Configuration 28

The radiation detection apparatus according to any one of configurations 19 to 26, wherein the holder upper surface portion and the holder lower surface portion are rigid members.

Configuration 29

The radiation detection apparatus according to any one of configurations 19 to 28, wherein the holder upper surface portion is arranged with an interval from a support base.

Configuration 30

The radiation detection apparatus according to any one of configurations 19 to 28, wherein the holder lower surface portion is arranged with an interval from a support base.

Configuration 31

The radiation detection apparatus according to any one of configurations 19 to 30, further comprising a fixing member configured to fix the built-in power supply to the holding member.

Configuration 32

The radiation detection apparatus according to any one of configurations 19 to 30, wherein the casing internally includes a reinforcing rib in a vicinity of the opening.

Configuration 33

The radiation detection apparatus according to configuration 32, wherein the reinforcing rib is a structure formed integrally with a member serving as the bottom surface portion, or a member fastened to the member serving as the bottom surface portion.

Configuration 34

The radiation detection apparatus according to any one of configurations 19 to 32, wherein the built-in power supply is a battery or a capacitor.

Configuration 35

The radiation detection apparatus according to any one of configurations 19 to 34, wherein the bottom surface portion includes a holding portion recessed toward the top surface portion.

Configuration 36

The radiation detection apparatus according to configuration 35, wherein a distance from the holding portion to a closest side surface portion is 25 mm to 40 mm.

Configuration 37

The radiation detection apparatus according to configuration 35 or 36, wherein the holding portion has a depth of 5.0 mm to 8.0 mm.

Configuration 38

The radiation detection apparatus according to any one of configurations 35 to 37, wherein the holding portion has a transverse length of 15 mm to 30 mm.

Configuration 39

The radiation detection apparatus according to any one of configurations 35 to 38, wherein, when an outer periphery of the bottom surface portion is regarded as quadrilateral in shape, the holding portion has a longitudinal length along a side corresponding to the side surface portion provided with the opening.

Configuration 40

The radiation detection apparatus according to any one of configurations 35 to 39, wherein the built-in power supply has a thickness less than a depth of the holding portion.

Configuration 41

The radiation detection apparatus according to any one of configurations 19 to 40, wherein the holding portion is attachable to and detachable from the casing through the opening.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors, circuitry, or combinations thereof (e.g., central processing unit (CPU), micro processing unit (MPU), or the like), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Applications No. 2023-090273, filed May 31, 2023, No. 2023-096030, filed Jun. 12, 2023, and No. 2024-023262, filed Feb. 19, 2024, which are each hereby incorporated by reference herein in their entirety.

What is claimed is:

1. A radiation imaging apparatus comprising:

a radiation detection panel configured to detect radiation;

a holding member configured to hold a power supply; and a casing configured to house the radiation detection panel, the power supply, and the holding member, wherein the casing includes a top surface portion allowing the radiation to enter the radiation detection panel, a bottom surface portion located on a side opposite to the top surface portion, and a side surface portion connecting the top surface portion and the bottom surface portion, wherein the side surface portion includes an opening through which the power supply is inserted into and removed from the casing, wherein the holding member is a separate part from the casing and fixed to the casing, and wherein, in a state where the holding member is fixed to the casing, the holding member includes a holder upper surface portion and a holder lower surface portion extending along the top surface portion, and a holder side surface portion connecting the holder upper surface portion and the holder lower surface portion, and each of the holder upper surface portion and the holder lower surface portion has a thickness less than a thickness of the holder side surface portion.

2. The radiation imaging apparatus according to claim 1, wherein the holder upper surface portion and the holder lower surface portion are separate parts from the holder side surface portion.

3. The radiation imaging apparatus according to claim 1, wherein the holder upper surface portion and the holder lower surface portion are made of a same material.

4. The radiation imaging apparatus according to claim 1, wherein the holder upper surface portion and the holder lower surface portion are made of different materials.

5. The radiation imaging apparatus according to claim 1, wherein the holder upper surface portion and the holder lower surface portion are made of a material same as a material of the holder side surface portion.

6. The radiation imaging apparatus according to claim 1, wherein the holder upper surface portion and the holder lower surface portion are made of a material different from a material of the holder side surface portion.

7. The radiation imaging apparatus according to claim 1, wherein the holder upper surface portion and the holder lower surface portion are made of a resin.

8. The radiation imaging apparatus according to claim 7, wherein the holder upper surface portion and the holder lower surface portion are made of a polyethylene terephthalate (PET) resin.

9. The radiation imaging apparatus according to claim 1, wherein the holder upper surface portion and the holder lower surface portion have flexibility.

10. The radiation imaging apparatus according to claim 1, wherein the holder upper surface portion and the holder lower surface portion are rigid members.

11. The radiation imaging apparatus according to claim 1, wherein the bottom surface portion includes a holding portion recessed toward the top surface portion.

12. The radiation imaging apparatus according to claim 11, wherein a distance from the holding portion to a closest side surface portion is 25 mm (millimeters) to 40 mm.

13. The radiation imaging apparatus according to claim 11, wherein the holding portion has a depth of 5.0 mm (millimeters) to 8.0 mm.

14. A radiation imaging apparatus, comprising:

a radiation detection panel configured to detect radiation;

a support base configured to support the radiation detection panel;

a holding member configured to hold a power supply; and a casing configured to house the radiation detection panel, the power supply, the support base, and the holding member, wherein the casing includes a top surface portion allowing the radiation to enter the radiation detection panel, a bottom surface portion located on a side opposite to the top surface portion, and a side surface portion connecting the top surface portion and the bottom surface portion, wherein the side surface portion includes an opening through which the power supply is inserted into and removed from the casing, and wherein the holding member is a separate part from the casing, is fixed to the casing in a vicinity of the opening, and has a portion located inward of the casing relative to the vicinity of the opening, the portion being arranged with an interval from at least one of the support base and an inner wall of the casing.

15. The radiation imaging apparatus according to claim 14, wherein the portion of the holding member located inward of the casing relative to the vicinity of the opening is arranged with an interval from both the support based and the inner wall of the casing.

16. The radiation imaging apparatus according to claim 14, further comprising a fixing member configured to fix the power supply to the holding member.

17. The radiation imaging apparatus according to claim 14, wherein the casing internally includes a reinforcing rib in a vicinity of the opening.

18. The radiation imaging apparatus according to claim 17, wherein the reinforcing rib is a structure formed integrally with a member serving as the bottom surface portion, or a member fastened to the member serving as the bottom surface portion.

19. The radiation imaging apparatus according to claim 14, wherein the power supply is a battery or a capacitor.

* * * * *